United States Patent
Van Driel

[15] 3,674,855

[45] July 4, 1972

[54] ORGANIC DIACYL PEROXIDES

[72] Inventor: Hendrik Van Driel, Hengelo, Netherlands

[73] Assignee: N.V. Chefaro Maatschappij, Rotterdam, Netherlands

[22] Filed: July 25, 1969

[21] Appl. No.: 845,057

[30] Foreign Application Priority Data

July 30, 1968  Great Britain.....................36,204/68

[52] U.S. Cl......................260/607 A, 260/80 C, 260/327 R, 260/332.1, 260/558 S, 260/578
[51] Int. Cl.......................................................C07c 147/02
[58] Field of Search................................260/607 A

[56] References Cited

UNITED STATES PATENTS

| | | | |
|---|---|---|---|
| 1,913,775 | 6/1933 | Straub | 260/610 D |
| 3,019,214 | 1/1962 | Pajaczkowski | 260/610 D UX |
| 3,076,852 | 2/1963 | Lohringer et al. | 260/610 D |
| 3,129,206 | 4/1964 | Pajaczkowski | 260/610 D UX |
| 3,232,922 | 2/1966 | Guillet et al. | 260/610 D X |

OTHER PUBLICATIONS

Hawkins " Organic Peroxides" (1961) pp. 300– 301

*Primary Examiner*—Lewis Gotts
*Assistant Examiner*—D. R. Phillips
*Attorney*—Lewis H. Eslinger, Alvin Sinderbrand and Curtis, Morris & Safford

[57] ABSTRACT

Organic diacyl peroxides containing one or more sulphonyl groups provided which do not explode upon moderate heating, have decreased shock-sensitivity and increase storage stability, and which function as very reactive polymerization initiators or catalysts. The improved diacyl peroxides are produced by reacting the corresponding carboxylic acid halide with hydrogen peroxide in the presence of an acid acceptor at a temperature of from −70° C. to 25° C. and then isolating the peroxide thus formed.

6 Claims, No Drawings

ORGANIC DIACYL PEROXIDES

This invention relates generally to improved organic diacyl peroxides and to the method of producing the same.

Organic diacyl peroxides, such as, dilauroyl peroxide and dibenzoyl peroxide, are in use in industry as polymerization catalysts or initiators for radical polymerizations. Most diacyl peroxides heretofore in use undergo radical decomposition with measurable speed at temperatures of from 50° to 100° C.

In the polymerization industry, the use of very reactive initiators is preferred in many cases, so that high reaction rates, and thus high production rates, can be achieved at rather low temperatures. It is known that peroxides are unstable compounds. The instability increases with the reactivity of the compounds. Highly reactive organic peroxides generally have the disadvantage of decomposing at room temperature, so that these compounds are of little technical and economical value. Further, at temperatures above room temperature, organic peroxides are often explosive. Many organic peroxides also have the disadvantage of being very shock-sensitive. Thus, it is known that, for example, diacetyl peroxide, dipropionyl peroxide and di-isobutyryl peroxide, decompose explosively upon heating. These compounds are also very shock-sensitive and, therefore, they are only available in commerce in phlegmatized condition, that is, in mixture with inert, desensitizing agents. Dipivaloyl peroxide, which is also described in the literature as a polymerization initiator, is not in use in practice despite its reactive nature, probably by reason of its great instability during storage, transport and handling.

Economically useful initiators for radical polymerization at temperatures below 50° C. are still very scarce and there is an urgent need for such initiators as polymers obtained in this temperature range have different properties from polymers obtained by high temperature polymerization.

Accordingly, it is an object of this invention to provide organic diacyl peroxides which are useful as initiators for radical polymerization at relatively low temperatures, and yet have high storage-stability and shock-insensitivity and do not explode upon heating to temperatures at which many known diacyl peroxides do explode.

A specific object is to provide usual organic diacyl peroxides which are solid at room temperature and which decompose readily into highly reactive radicals in the temperature range from −50° to 100° C., while possessing high storage-stability and shock-insensitivity and relatively low explosiveness.

More particularly, it is an object of the invention to provide organic diacyl peroxides containing one or more sulphonyl groups and which possess the above desirable properties.

A further object is to provide a method for conveniently and economically producing the sulphonyl containing organic diacyl peroxides according to the invention.

The organic diacyl peroxides according to the invention have a general formula selected from the following:

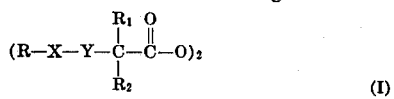

(I)

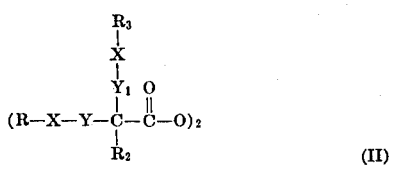

(II)

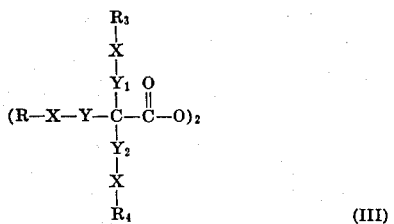

(III)

In Formula (I):

X is a sulphonyl group ($SO_2$);

Y is optionally present and, when present, is a substituted or unsubstituted alkylene, cycloalkylene- or cycloalkylenediyl group;

R is a substituted or unsubstituted alkyl-, cycloalkyl-, aralkyl- or aryl group, or, if Y is present, forms, together with Y, a substituted or unsubstituted alkanyl-ylidene- or alkanetriyl group;

$R_1$ is hydrogen, a substituted or unsubstituted alkyl-, cycloalkyl-, or aryl group, or together with R forms a substituted or unsubstituted alkylene- or cycloalkylene group, or, if Y is present, forms together with Y a substituted or unsubstituted alkanyl-ylidene or alkanetriyl group or forms together with R and Y an alkanediyl-ylidene- or alkanetetrayl group; and $R_2$ is hydrogen, a substituted or unsubstituted alkyl-, cycloalkyl-, aralkyl- or aryl group, or forms, with either R or $R_1$, a substituted or unsubstituted alkylene- or cycloalkylene group, or forms together with R and $R_1$, a substituted or unsubstituted alkanetriyl group, or if Y is present, forms together with Y a substituted or unsubstituted alkanyl-ylidene- or alkanetriyl group, or forms, together with Y and either R or $R_1$, a substituted or unsubstituted alkanediyl-ylidene- or alkanetetrayl group.

In Formula (II):

X, Y and R have the meanings given above;

$Y_1$ is optionally present and, when present, is a substituted or unsubstituted alkylene-, cycloalkylene- or cycloalkanediyl group, or forms, together with R, a substituted or unsubstituted alkanyl-ylidene- or alkanetriyl group, or if Y is present, forms together with Y, a substituted or unsubstituted alkanediylidene-, alkanediyl-ylidene- or alkanetetrayl group, or, together with R and Y, a substituted or unsubstituted alkanyl-diylidene-, alkanetriyl-ylidene or alkanepentayl group;

$R_2$ is hydrogen, a substituted or unsubstituted alkyl-, cycloalkyl-, aralkyl- or aryl group, or forms, together with R, a substituted or unsubstituted alkylene- or cycloalkylene group, or, if Y or $Y_1$ is present, forms together with either Y or $Y_1$, a substituted or unsubstituted alkanyl-ylidene or alkanetriyl group, or forms, together with R and either Y or $Y_1$, a substituted or unsubstituted alkanediyl-ylidene- or alkanetetrayl group, or, if both Y and $Y_1$ are present, forms, together with Y and $Y_1$, a substituted or unsubstituted alkanyl-diylidene-, alkanetriyl-ylidene or alkanepentayl group; and $R_3$ is a substituted or unsubstituted alkyl-, cycloalkyl-, aralkyl- or aryl group, or forms, together with either R or $R_2$, a substituted or unsubstituted alkylene- or cycloalkylene group, or forms, together with R and $R_2$, a substituted or unsubstituted alkanetriyl group, or, if either Y or $Y_1$ is present, forms, together with either Y or $Y_1$, a substituted or unsubstituted alkanyl-ylidene- or alkanetriyl group, or forms, together with either Y or $Y_1$ and either R or $R_2$, a substituted or unsubstituted alkanediyl-ylidene- or alkanetetrayl group, or, if Y and $Y_1$ are both present, forms, together with Y and $Y_1$, a substituted or unsubstituted alkanyl-diylidene-, alkanetriyl-ylidene- or alkanepentayl group.

In Formula (III):

X, Y, $Y_1$ and R have the meanings given above;

$R_3$ is a substituted or unsubstituted alkyl-, cycloalkyl-, aralkyl- or aryl group, or forms, together with R, a substituted or unsubstituted alkylene- or cycloalkylene group, or, if either Y or $Y_1$ is present, forms together with either Y or $Y_1$, a substituted or unsubstituted alkyl-ylidene- or alkanetriyl group, or forms, together with R and either Y or $Y_1$, a substituted or unsubstituted alkanediyl-ylidene- or alkanetetrayl group, or, if Y and $Y_1$ are both present, forms, together with Y and $Y_1$, a substituted or unsubstituted alkanyl-diylidene-, alkanetriyl-ylidene- or alkanepentayl group;

$R_4$ is a substituted or unsubstituted alkyl-, cycloalkyl-, aralkyl- or aryl group, or forms, together with either R or $R_3$, a substituted or unsubstituted alkylene- or cycloalkylene group, or forms, together with R and $R_3$, a substituted or unsubstituted alkanetriyl group, or, if either Y or $Y_1$ is present, forms, together with either Y or $Y_1$, a substituted or unsubstituted alkanyl-ylidene or alkanetriyl group, or forms, together with either R or $R_3$ and either Y or $Y_1$, a substituted or unsubstituted alkanediyl-ylidene- or alkanetetrayl group, or, if Y and $Y_1$ are both present, forms together with Y and $Y_1$, a substituted or unsubstituted alkanyl-diylidene-, alkanetriyl-ylidene- or alkanepentayl group; and $Y_2$ is optionally present and, when present, is a substituted or unsubstituted alkylene-, cycloalkylene- or cycloalkanediyl group, or forms, together with R or $R_3$ or $R_4$, a substituted or unsubstituted alkanyl-ylidene- or alkanetriyl group, or forms, together with R and $R_3$ or together with R and $R_4$ or together with $R_3$ and $R_4$, a substituted or unsubstituted alkanediyl-ylidene- or alkanetetrayl group, or, if either Y or $Y_1$ is present, forms, together with either Y or $Y_1$, a substituted or unsubstituted alkanediyl-idene-, alkanediyl-ylidene- or alkanetetrayl group, or forms, together with R or $R_3$ or $R_4$ and either Y or $Y_1$, a substituted or unsubstituted alkanyl-diylidene-, alkanetriyl-ylidene or alkanepentayl group, or, if Y and $Y_1$ both present, forms, together with Y and $Y_1$, a substituted or unsubstituted alkanetriylidene-, alkanediyl-diylidene, alkanetetrayl-ylidene- or alkanehexayl group.

Preferred embodiments of the invention are compounds according to Formula (I) in which: Y is methylene; R is a straight or branched alkyl group containing from one to 18 carbon atoms, the cyclohexyl group, the benzyl group or the phenyl group, which may carry one or more substituents from the class of low-molecular branched or straight alkyl and alkoxy groups with one to four carbon atoms, halogen atoms and nitro groups; $R_1$ is a hydrogen atom, a straight or branched low-molecular weight alkyl group with one to four carbon atoms or the phenyl group; and $R_2$ is a hydrogen atom, a straight or branched low-molecular weight alkyl group with one to four carbon atoms or the phenyl group.

Examples of groups that may be represented by Y, $Y_1$ and $Y_2$ are low-molecular alkylene groups, such as the methylene-, dimethylene- and trimethylene groups, or the 1,4-cyclohexanediyl group. Examples of groups that may be represented by R, $R_3$ and $R_4$ are straight or branched alkyl groups with one to 18 carbon atoms, such as the methyl-, ethyl-, n-propyl-, isopropyl-, butyl-, tert.-butyl-, amyl-, isoamyl-, octyl-, isooctyl-, nonyl(pelargonyl)-, decyl-, dodecyl(lauryl)-, myristyl-, palmityl- and stearyl groups, 5- and 6- membered cycloalkyl groups, such as the cyclopentyl-, cyclohexyl-, methylcyclopentyl-, methylcyclohexyl-, trimethylcyclohexyl-, ethylcyclohexyl-, propylcyclohexyl-, isopropylcyclohexyl-, n-butyl-cyclohexyl- and tert.-butyl-cyclohexyl groups, aralkyl groups, such as the benzyl-, halogenobenzyl- and phenethyl groups, aryl groups such as the phenyl-, halogenophenyl-, tolyl-, mesityl-, tert.-butylphenyl-, methoxyphenyl-, ethoxyphenyl-, mono-, di- or trihalogenophenyl-, nitro- amino- or amidophenyl groups and the corresponding naphtyl groups. Especially preferred groups to be represented by R, $R_3$ and $R_4$ are the alkyl groups, such as the methyl-, n-butyl- and dodecyl groups, the cyclohexyl group, the 4-tert.-butylcyclohexyl group, the phenyl-, the halogenophenyl-, the benzyl-, the halogenobenzyl- and the phenethyl groups.

Examples of groups or radicals to be represented by $R_1$ and $R_2$ are hydrogen, straight or branched alkyl groups with one to 12 carbon atoms, such as the methyl-, ethyl-, n-propyl-, isopropyl-, butyl-, amyl-, octyl- or dodecyl groups, 5- and 6- membered cycloalkyl groups, such as the cyclopentyl-, cyclohexyl-, methylcyclopentyl- or methylcyclohexyl groups, aralkyl groups, such as the benzyl group, and aryl groups such as the phenyl group. The preferred residue represented by $R_1$ or $R_2$ is hydrogen, or a methyl, ethyl or phenyl group.

If the residue R is joined with the residue $R_1$, $R_2$, $R_3$ or $R_4$ with formation of a straight or branched alkylene group, this group may be a methylene-, a dimethylene-, a trimethylene- or a tetramethylene group. Preferred and typical examples of R joined together with $R_1$ or $R_2$, when the group Y is not present, are the trimethylene- and the tetramethylene groups. When Y is a methylene group, R joined with $R_1$ or $R_2$ is preferably the dimethylene- or the trimethylene group; when Y is a dimethylene group, R joined with $R_1$ or $R_2$ is preferably the methylene- or the dimethylene group. A preferred and typical example of R joined together with $R_3$ or $R_4$, when Y joined with $Y_1$ or $Y_2$ is a methylene group, is the methylene group.

If the residue $R_1$ is joined with the residue $R_2$ to form a straight or branched alkylene group, this group is preferably the tetramethylene- or the pentamethylene group.

If the residue $R_2$ is joined with the residue $R_3$ to form a straight or branched alkylene group, this group may be a methylene-, a dimethylene-, a trimethylene- or a tetramethylene group. Typical and preferred examples of $R_2$ joined with $R_3$, when $Y_1$ is not present, are the trimethylene- and the tetramethylene groups. When $Y_1$ is a methylene group, $R_2$ joined with $R_3$ is preferably the dimethylene- or the trimethylene group. When the group $Y_1$ is a dimethylene group, $R_2$ joined with $R_3$ is preferably the methylene- or the dimethylene group.

If the residue $R_3$ is joined with the residue $R_4$ to form a straight or branched alkylene group, this group is preferably the methylene group for the case where $Y_1$ and $Y_2$ are methylene groups.

If the residue R or $R_1$ or $R_2$ is joined with the residue Y to form a straight or branched alkanyl-ylidene- or alkanetriyl group, this group may be a 1-butanyl-4-ylidene-, a 1-pentanyl-5-ylidene-, a 1, 2, 4-butanetriyl-, a 1,2,5-pentanetriyl-, a 1, 3, 5-pentantriyl-, a 1,2,6-hexanetriyl-, a 2-methylene-1, 4-butylene-, a 2-methylene-1,5-pentylene or a 3-methylene-1,5-pentylene group. Typical and preferred examples of the residue R or $R_1$ or $R_2$ joined with Y are the 1-butanyl-4-ylidene-, the 1-pentanyl-5-ylidene and the 1, 3, 5-pentanetriyl groups.

If the residue R is joined with the residue $Y_1$ or $Y_2$ to form an alkanyl-ylidene or alkanetriyl group, this group, when Y is the methylene group, may be a 1-ethanyl-2-ylidene- or a 1-propanyl-3-ylidene group; or when Y is the dimethylene group, such joined group may be a methylidyne- or a 1-ethanyl-2-ylidene group.

If the residue $R_2$ is joined with the residue $Y_1$ to form an alkanyl-ylidene- or alkanetriyl group, this group is preferably the 1-butanyl-4-ylidene- or the 1-pentanyl-5-ylidene group.

If the residue $R_3$ is joined with the residue $Y_1$ to form an alkanyl-ylidene- or alkanetriyl group, this group is preferably the 1-butanyl-4-ylidene- or the 1-pentanyl-5-ylidene group.

If the residue $R_3$ is joined with the residue Y or $Y_2$ to form an alkanyl-ylidene- or alkanetriyl group, this group, when $Y_1$ is the methylene group, may be a 1-ethanyl-2-ylidene- or a 1-propanyl-3-ylidene group; or, when $Y_1$ is the ethylene group, the joined group may be a methylidyne- or a 1-ethanyl-2-ylidene group.

If the residue $R_4$ is joined with the residue $Y_2$ to form an alkanyl-ylidene- or alkanetriyl group, this group is preferably the 1-butanyl-4-ylidene- or the 1-pentanyl-5-ylidene group. If the residue $R_4$ is joined with the residue Y or $Y_1$ to form an alkanyl-ylidene-or alkanetriyl group, this group, when $Y_2$ is the methylene group, may be a 1-ethanyl-2-ylidene- or a 1-propanyl-3-ylidene group; or, when $Y_2$ is the ethylene group, the joined group may be a methylidyne- or a 1-ethanyl-2-ylidene group.

The organic peroxides according to the invention containing one or more sulphonyl groups do not explode on heating to temperatures at which analogous peroxides, but not containing one or more sulphonyl groups, would explode, have a considerably repressed shock-sensitivity and a strongly increased storage stability as compared with analogous peroxides, not containing one or more sulphonyl groups. A comparison of the thermal properties of, for instance, dipivaloyl peroxide and di-isobutyryl peroxide with analogues containing one or two sulphonyl groups makes it clear that the peroxides according to the invention are very superior in that respect. This will be further illustrated in the examples below.

The reactivity of the novel organic peroxides according to the invention is of the same order of magnitude as the reactivity of analogous peroxides not containing sulphonyl groups, as will be clear from the half-life times given in Table I below.

Such half-life times of the thermolysis have been determined iodometrically or gasometrically, that is, by measurement of the gas evolved during decomposition in benzene or toluene as a solvent at 40° C.

TABLE I

| Peroxide | half-life time at 40° C | solvent |
|---|---|---|
| dilauroylperoxide (prior art) | 126 hr. | benzene |
| diisobutyryl peroxide (prior art) | 1.08 hr. | benzene |
| dipivaloyl peroxide (prior art) | 0.0167 hr. | benzene |
| di(3-n-butylsulphonyl-2,2-dimethylpropionyl) peroxide | 0.0183 hr. | toluene |
| di(3-n-butylsulphonyl-2-methylpropionyl) peroxide | 1.8 hr. | toluene |
| di(2-n-butylsulphonyl-2-methylpropionyl) peroxide | 2.15 hr. | toluene |

The storage stability of the novel organic peroxides is much greater than that of the corresponding peroxides not containing sulphonyl groups, as will be clear from Table II below. For example, the stability of di-(3-phenylsulphonyl-2-methylpropionyl)-peroxide is, at 20° C., 20 times the storage stability of the corresponding di-isobutyryl-peroxide in phlegmatized condition, and the first-mentioned peroxide does not explode on heating and is not shock-sensitive contrary to said di-isobutyryl-peroxide.

The comparison of the storage stability of the organic diacyl peroxides according to this invention and of the analogous peroxides not containing sulphonyl groups was obtained by determining the rates of decrease of active oxygen content of the respective peroxides at 20° and 5° C., with the active oxygen content being determined by iodometric titration using the sodiumiodide-acetone method.

TABLE II

| Peroxide | Decrease in active oxygen content in percent per hr. | |
|---|---|---|
| | at 20° C. | at 5° C. |
| Dipivaloylperoxide (solid) (prior art) | Totally decomposed within 2 minutes | — |
| Di(3-n-butylsulphonyl-2,2-dimethyl-propionyl) peroxide (solid) | 5% | 0.3% |
| Di(3-laurylsulphonyl-2,2-dimethyl-propionyl) peroxide (solid) | 1.4% | 0.054% |
| Di[2,2-bis(methylsulphonylmethylene)-propionyl]peroxide (solid) | 0.57% | — |
| Di-isobutyrylperoxide (prior art) (25% in mineral oil) | 0.54% | 0.087% |
| Di(2-n-butylsulphonyl-2-methyl-propionyl) peroxide (solid) | 0.12% | — |
| Di(3-n-butylsulphonyl-2-methyl-propionyl)peroxide (solid) | 0.040% | 0.007% |
| Di(3-laurylsulphonyl-2-methyl-propionyl)peroxide (solid) | 0.030% | 0.0008% |
| Di(3-phenylsulphonyl-2-methyl-propionyl)peroxide (solid) | 0.026% | not measurable after 1 month |
| Di(1,1-dioxide-3-tetrahydro-thenoyl)peroxide (solid) (prior art) | 0.011% | — |
| Di(3,5,5-trimethylhexanoyl) peroxide (liquid) (prior art) | 0.011% | 0.003% |
| Di-(3-cyclohexylsulphonyl-2-methylpropionyl)peroxide | 0.35% | 0.023% |
| Di-(3-benzylsulphonyl-2-methylpropionyl)peroxide | 0.024% | 0.004% |
| Di[3-(p-chlorophenylsulphonyl)-2-methylpropionyl]peroxide | 0.05% | — |
| Di-[3-(p-chlorobenzylsulphonyl)-2-methylpropionyl]peroxide | 0.10% | — |
| Di-[3-(4-t-butylcyclohexylsulphonyl)-2-methylpropionyl] peroxide | 0.44% | 0.028% |
| Di-(4-cyclohexylsulphonylcyclohexane-carbonyl)peroxide | 3.7% | — |

The organic diacyl peroxides obtained according to this invention, are characterized by the typical carbonyl absorption of the diacyl peroxides in the infrared spectrum at about 1,770–1,785 $cm^{-1}$ and 1,800–1,820 $cm^{-1}$, and further by absorption bands at about 1,105–1,120 $cm^{-1}$ and 1,295–1,300 $cm^{-1}$ in the infrared spectrum, which latter bands are characteristic of the sulphonyl group. Further, when heated, the compounds according to the invention split off carbon dioxide.

The diacyl peroxides according to the invention can be conveniently prepared at low cost by reacting at least two molecular equivalents of the corresponding carboxylic acid halide, preferably the chloride, with the molecular equivalent of hydrogen peroxide in the presence of an acid acceptor at a temperature of from −70° to 25° C. and then isolating the peroxide thus formed.

The reaction is preferably carried out in the presence of a solvent or diluent. Examples of solvents which may be used are water, solvents miscible with water, such as glycol-ethers, for example, dimethoxy ethane, ethylene glycol monobutyl ether or diethylene glycol monoethyl ethers, sulfoxides, such as dimethylsulfoxide, amides, such as N-methyl-pyrrolidone, cyclic ethers, such as dioxane, and solvents not miscible with water, such as ethers, for example, chloroform and carbon tetrachloride, and hydrocarbons, for example, petroleum ether.

Examples of acid acceptors which may be used in the process are inorganic and organic bases. When working in the aqueous phase, an inorganic base for example sodium hydroxide, is usually used. Further specific examples of suitable acid acceptors are alkali metal or alkaline earth metal hydroxides, oxides or carbonates, tertiary organic amines such as trimethylamine, triethylamine, pyridine and other organic bases which cannot be acylated.

The reaction time and temperature depend on the reactivity of the carboxylic acid chloride, which is used as the starting material, and on the thermal stability of the peroxide formed. The reaction time is generally from about 5 to 60 minutes, and the reaction temperature is generally from about −50° to 10° C. In the temperature range of from about −50° to −25° C., triethylamine is preferably used as the acid acceptor.

The isolation of the diacyl peroxide that is thus formed can be effected by filtration, separation, extraction or evaporation of the solvent under reduced pressure.

Generally, the starting materials for producing organic diacyl peroxides according to this invention are readily available at low cost, particularly when the thioether function is introduced into the compounds by the reaction of the corresponding mercaptans with halogenated or unsaturated carboxyl acids or their esters. The mercaptans, as well as the mentioned acids or esters, are readily available in practice. The thio-ether group can be oxidized thereafter to a sulphonyl group according to one of the usual methods, for instance with hydrogen peroxide in acetic acid. In some cases the carboxylic acid group can be introduced by the addition of cyanohydrin to unsaturated sulphones.

Typical examples of the organic diacyl peroxides according to the invention are the diacyl peroxides corresponding to the carboxylic acid chlorides which, in turn, correspond to the following organic acids: (methylsulphonyl)-acetic acid, (n-butylsulphonyl)-acetic acid, laurylsulphonyl-acetic acid,(cyclohexylsulphonyl)-acetic acid, (4-tert.-butylcyclohexylsulphonyl)-acetic acid, bis(methylsulphonyl)-acetic acid, 3-n-butylsulphonyl propionic acid, 2-cyclohexylsulphonyl-propionic acid, 2-(4-tert.-butylcyclohexylsulphonyl)-propionic acid, 2-cyclohexylsulphonyl-2-methylpropionic acid, 2-n-butylsulphonyl-2-methylpropionic acid, 3-methylsulphonyl-2-methylpropionic acid, 3-n-butylsulphonyl-2-methylpropionic acid, 3-laurylsulphonyl-2-methyl-propionic acid, 3-cyclohexylsulphonyl-2-methylpropionic acid, 3-(4-tert.-butylcyclohexylsulphonyl)-2-methylpropionic acid, 3-phenylsulphonyl-2-methylpropionic acid, 3-benzylsulphonyl-2-methylpropionic acid, 2-[4,4-dioxo-4-thiacyclohexyl]-propionic acid, 3-n-butylsulphonyl-2,2-dimethylpropionic acid, 3-laurylsulphonyl-2,2-dimethylpropionic acid, 3-cyclohexylsulphonyl-2,2 dimethylpropionic acid, 3-[4-tert.-butylcyclohexylsulphonyl]-2,2-dimethylpropionic acid, 2,2-bis-(methylsulphonylmethylene) propionic acid, 4-cyclohexylsulphonylcyclohexane-carboxylic acid, 1,1-dioxo-tetrahydrothiophene-3-carboxylic acid, 1,1-dioxo-3-methyltetrahydrothiophene-3-carboxylic acid, 1,1-dioxotetrahydrothiopyrane-4-carboxylic acid, 3-(p-chlorophenylsulphonyl)-2-2-methylpropionic acid, 3-(p-chlorobenzylsulphonyl)-2-methylpropionic acid, 3-phenylsulphonylpropionic acid, 3-benzylsulphonylpropionic acid, and 3-laurylsulphonylpropionic acid.

When the thermolysis of organic diacyl peroxides according to the invention is carried out in the presence of monomeric vinylstyrene- or acrylic compounds, colorless polymers are formed quickly. The diacyl peroxides provided by the invention may also be used for the initiation of other radical polymerizations such as copolymerizations, for the cross-linking and curing of unsaturated polymers, such as unsaturated polyesters, natural and synthetic elastomers. The novel peroxides can also be used for the polymerization of ethylene according to the high pressure process.

The preparation of organic diacyl peroxides according to this invention will be further described with reference to the illustrative examples that follow:

EXAMPLE 1

1.60 grams (15.8 mMoles) of triethylamine were added dropwise with stirring over a period of 15 minutes to a solution of 3.68 grams (15.0 mMoles) of 3-n-butylsulphonyl-2,2-dimethylpropionyl chloride and 0.54 grams (7.9 mMoles) of a 50 percent aqueous hydrogen peroxide solution in 50 ml of dimethoxyethane at −40° C. After 30 minutes the reaction mixture was poured into 500 ml of water of 0° C. The white precipitate that resulted was extracted from the aqueous mixture with 40 ml of chloroform and thereafter precipitated from the chloroform solution with petroleum ether. After filtering, 3.1 grams of solid crystalline di(3-n-butylsulphonyl-2,2-dimethylpropionyl) peroxide were obtained. The active oxygen content was found to be 3.26 percent (theoretical active oxygen content: 3.62 percent). The obtained peroxide "puffed off," when heated in the dry state to 44° C. The infrared spectrum shows the absorption double band at 1,775 and 1,805 cm$^{-1}$, which is characteristic of the diacyl carbonyl group, and strong absorption bands at 1,120 and 1,300 cm$^{-1}$ which are characteristic of the sulphonyl group. The product of this example has the structural formula:

$$(C_4H_9-SO_2-CH_2-\underset{\underset{CH_3}{|}}{\overset{\overset{CH_3}{|}}{C}}-CO_2)_2$$

EXAMPLE 2

7.36 grams (30 mMoles) of 3-n-butylsulphonyl-2,2-dimethylpropionylchloride dissolved in 10 ml of chloroform were added dropwise with stirring over a period of 20 minutes to a mixture of 1.3 grams (33 mMoles) of sodiumhydroxide, 1.10 grams (16.5 mMoles) of a 50 percent aqueous hydrogen peroxide solution, two drops of cetaline and 10 ml of water at −5° C. After an hour, 30 ml of petroleum ether were added and the white precipitate thus formed was filtered off. After washing with ice-cold water, the precipitate was dissolved in chloroform and precipitated by adding petroleum ether. By filtering off, there were obtained 5.6 grams of di(3-n-butylsulphonyl-2,2-dimethylpropionyl) peroxide with an active oxygen content of 3.39 percent (theor. 3.62 percent).

The infra-red data and structural formula are the same as in Example 1.

EXAMPLE 3

1.60 grams (15.9 mMoles) of triethylamine were added dropwise with stirring over a period of 50 minutes to a solution of 0.55 grams (8 mMoles) of a 50 percent aqueous hydrogen peroxide solution and 3.5 grams (15.5 mMoles) of 3-n-butylsulphonyl-2-methylpropionyl chloride in 50 ml of dimethoxyethane at −40° C. After 30 minutes, the reaction mixture was poured out into 500 ml of water at 0° C. The white precipitate that formed was separated from the aqueous layer, washed with water and dried in vacuo. 2.6 grams of di(3-n-butylsulphonyl-2-methylpropionyl) peroxide with an active oxygen content of 3.81 percent were obtained (theoretical active oxygen content: 3.85 percent). This peroxide was not shock-sensitive. When heated in the dry state, the compound melted at 60° C. with slight evolution of gas.

The infra-red spectrum shows an absorption double band at 1,770 and 1,800 cm$^{-1}$ for the diacyl carbonyl group and strong absorption bands at 1,115 and 1,295 cm$^{-1}$ for the sulphonyl group. The product of this example has the structural formula:

$$(C_4H_9-SO_2-CH_2-\underset{\underset{}{}}{\overset{\overset{CH_3}{|}}{C}}H-CO_2)_2$$

EXAMPLE 4

22.65 grams (100 mMoles) of 3-n-butylsulphonyl-2-methylpropionyl chloride mixed with 3 ml of chloroform were added with stirring over a period of 30 minutes to a mixture of 4.4 grams (110 mMoles) of sodium hydroxide, 3.8 grams (55 mMoles) of a 50 percent aqueous hydrogen peroxide solution, two drops of cetaline and 40 ml of water at 0° C. After an hour, the white granular precipitate that formed was filtered off, washed neutral with water and dried, to yield 19.7 grams of di(3-n-butylsulphonyl-2-methylpropionyl) peroxide with an active oxygen content of 3.78 percent (theor. 3.85 percent). Recrystallization from chloroform-petroleum ether yielded a product with an active oxygen content of 3.82 percent. The infra-red data and structural formula are the same as in Example 3.

EXAMPLE 5

3.33 grams (33 mMoles) of triethylamine were added dropwise with stirring over a period of 15 minutes to a solution of 9.60 grams (30 mMoles) of 3-laurylsulphonyl-2,2-dimethylpropionyl chloride and 1.10 grams (16.5 mMoles) of a 50 percent aqueous hydrogen peroxide solution in 120 ml of dimethoxyethane at −30° C. After 30 minutes, the reaction mixture was poured out into 500 ml of ice-water. The white precipitate that formed was extracted from the aqueous mixture with 60 ml of chloroform. By adding petroleum ether to the chloroform solution, the peroxide was precipitated. The peroxide obtained was recrystallized from chloroform-petroleum ether and dried to yield 6.5 grams of di-(3-laurylsulphonyl-2,2-dimethylpropionyl) peroxide with an active oxygen content of 2.13 percent (theor. 2.66 percent). The peroxide obtained was not shock-sensitive. When heated in the dry state the peroxide melted at 50° C. under decomposition with slight evolution of gas. The infra-red spectrum shows an absorption double band at 1,770 and 1,800 cm$^{-1}$ for the diacyl carbonyl group and strong absorption bands at 1,120 and 1,300 cm$^{-1}$ for the sulphonyl group. The product of this example has the structural formula:

$$(C_{12}H_{25}-SO_2-CH_2-\underset{\underset{CH_3}{|}}{\overset{\overset{CH_3}{|}}{C}}-CO_2)_2$$

EXAMPLE 6

33.9 grams (100 mMoles) of 3-laurylsulphonyl-2-methylpropionyl chloride dissolved in 50 ml of chloroform were added with stirring over a period of 60 minutes to a mixture of 4.4 grams (110 mMoles) of sodium hydroxide, 3.8 grams (55 mMoles) of a 50 percent aqueous hydrogen peroxide solution, two drops of cetaline and 50 ml of water at 0°–5° C. After 60 minutes, the white product that formed was filtered off, washed alkali-free with water and dried in vacuo to yield 25.0 grams of white crystalline di-(3-laurylsulphonyl-2-methylpropionyl) peroxide with an active oxygen content of 2.43 percent (theor. 2.79 percent). The peroxide obtained was not shock-sensitive and, when heated in the dry state, melted at 75° C. under decomposition with a slight evolution of gas. The infra-red spectrum shows absorption of the CO-group at 1,775 and 1,810 cm$^{-1}$, and absorption of the sulphonyl group at 1,120 and 1,295 cm$^{-1}$. The product of this example has the structural formula:

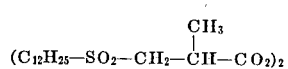

EXAMPLE 7

6.36 grams (63.6 mMoles) of triethylamine were added dropwise with stirring over a period of 10 minutes to a solution of 13.6 grams (60 mMoles) of 2-n-butylsulphonyl-2-methylpropionyl chloride and 2.15 grams (31.7 mMoles) of a 50 percent aqueous hydrogen peroxide solution in 200 ml of dimethoxyethane at −40° C. After 30 minutes, the reaction mixture was poured out into 600 ml of water of 0° C. The white precipitate that formed was extracted from the aqueous layer with chloroform. The chloroform solution was dried. By adding petroleum ether, the peroxide was precipitated from the chloroform-solution to yield 9.5 grams of di(2-n-butylsulphonyl-2-methylpropionyl) peroxide with an active oxygen content of 3.73 percent (theor. 3.87 percent). The peroxide obtained was not shock-sensitive. When heated in the dry state, the product melted at 65° C. with some evolution of gas. The infrared spectrum showed absorption of the carbonyl group at 1,770 and 1,800 cm$^{-1}$ and of the sulphonyl group at 1,115 and 1,295 cm$^{-1}$. The product of this example has the structural formula:

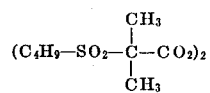

EXAMPLE 8

10.6 grams (50 mMoles) of 3-n-butylsulphonylpropionyl chloride, suspended in 50 ml of chloroform were added with stirring over a period of 60 minutes to a mixture of 2.20 grams (55 mMoles) of sodium hydroxide, 1.87 grams (27.5 mMoles) of a 50 percent aqueous hydrogen peroxide solution, two drops of cetaline and 25 ml of water at 0° C. After maintaining the reaction mixture at 0°C. for another hour, 150 ml of methanol were added, which caused the formation of a white precipitate. The pH of the reaction mixture was adjusted to 6 by adding acid. The precipitate was filtered off and washed with ice-water. Recrystallization from acetone yielded 4.70 grams of di(3-n-butylsulphonylpropionyl) peroxide with an active oxygen content of 4.15 percent (theor. 4.15 percent). The peroxide was not shock-sensitive. When heated in the dry state, the product melted at 125° C. with some evolution of gas. The infra-red spectrum showed absorption of the CO-group at 1,770 and 1,800 cm$^{-1}$ and of the SO$_2$-group at 1,115 and 1,295 cm$^{-1}$. The product of this example has the structural formula:

EXAMPLE 9

24.7 grams (100 mMoles) of 3-phenylsulphonyl-2-methylpropionyl chloride dissolved in 30 ml of chloroform were added with stirring over a period of 20 minutes to a mixture of 4.40 grams (110mMoles) of sodium hydroxide, 3.8 grams (55 mMoles) of a 50 percent aqueous hydrogen peroxide and two drops of cetaline at 0° C. After maintaining the reaction mixture at 0°–5° C. for a further 30 minutes, 100 ml of petroleum ether were added. The precipitate that formed was filtered off and washed neutral with water. Recrystallization from a chloroform-petroleum ether mixture yielded 19.7 grams of di-(3-phenylsulphonyl-2-methylpropionyl) peroxide with an active oxygen content of 3.04 percent (theor. 3.53 percent). The peroxide obtained was not shock-sensitive. When heated in the dry state, the compound melted at 75° C. under gas evolution. The infra-red spectrum showed absorption of the carbonyl group at 1,785 and 1,820 cm$^{-1}$ and of the sulphonyl group at 1,115 and 1,294 cm$^{-1}$. The product of this example has the structural formula:

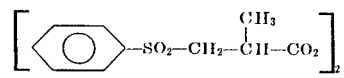

EXAMPLE 10

2.39 grams (23.6 mMoles) of triethylamine were added over a period of 15 minutes to a solution of 4.1 grams (22.5 mMoles) of 1,1-dioxide-tetrahydro-tetrahydro-3-thenoyl chloride and 0.84 grams (12.4 mMoles) of a 50 percent aqueous hydrogen peroxide solution in 100 ml of dimethoxyethane at −40° C. After 30 minutes, 100 ml of water were added slowly to the reaction mixture. The fine precipitate that formed was filtered off and washed subsequently with water, ethanol and diethyl ether to yield 2.0 grams of di(1,1-dioxide-tetrahydro-3-thenoyl) peroxide. When heated in the dry state the compound "puffed off" at 97° C. The product of this example has the structural formula:

EXAMPLE 11

1.59 grams (15.9 mMoles) of triethylamine were added over a period of 10 minutes to a solution of 4.15 grams (15 mMoles) of 2,2-bis(methylsulphonylmethylene) propionyl chloride and 0.54 grams (7.92 mMoles) of a 50 percent aqueous hydrogen peroxide solution in 100 ml acetonitril at −40° C. After a further 40 minutes, the reaction mixture was filtered. By adding 300 ml of cold ethanol to the filtrate, the peroxide was precipitated. The white precipitate was filtered off and dried to yield 2.9 grams of di(2,2-bismethylsulphonylmethylene) propionyl peroxide with an active oxygen content of 2.68 percent (theor. 3.12 percent). The peroxide was slightly shock-sensitive. When heated in the dry state, the compound puffed off at 60° C. The product of this example has the structural formula:

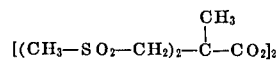

EXAMPLE 12

3.18 grams (31.5 mMoles) of triethylamine were added over a period of 10 minutes to a solution of 7.6 grams (30 mMoles) of 3-cyclohexylsulphonyl-2-methylpropionylchloride and 1.08 grams (15.8 mMoles) of a 50 percent aqueous hydrogenperoxide solution in 100 mls. of dimethoxyethane at −40° C. After 30 minutes, the reaction mixture was poured out into 300 ml. of ice-water. The white precipitate that formed was extracted from the aqueous layer with 150 mls. of chloroform. The peroxide was precipitated from the chloroform solution by adding petroleum ether to yield 4.7 grams of di(3-cyclohexylsulphonyl-2-methylpropionyl) peroxide with an active oxygen content of 3.21 percent (theor.: 3.44 percent). The peroxide obtained was not shock-sensitive. When heated in the dry state, the product melted at 84° C. with evolution of gas. The infra-red spectrum showed absorption of the carbonyl group at 1,775 cm$^{-1}$. The product of this example has the structural formula:

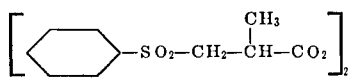

EXAMPLE 13

1.59 grams (15.9 mMoles) of triethylamine were added over a period of 5 minutes to a solution of 3.9 grams (15 mMoles) of 3-benzylsulphonyl-2-methylpropionylchloride and 0.54 grams (7.9 mMoles) of a 50 percent aqueous hydrogenperoxide solution in 50 mls. of dimethoxyethane at −40° C. After 30 minutes, the reaction mixture was poured out into 200 mls. of water of 0° C. The white precipitate that formed was filtered from the aqueous suspension and dried to yield 3.1 grams of di(3-benzylsulphonyl-2-methylpropionyl) peroxide with an active oxygen content of 3.14 percent (theor. 3.56 percent). The peroxide obtained was not shock-sensitive. When heated in the dry state, the product puffed off at 91° C. The infra-red spectrum showed absorption of the carbonyl group at 1,770 and 1,800 cm$^{-1}$. The product of this example has the structural formula:

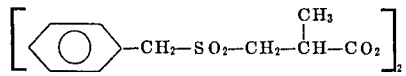

EXAMPLE 14

A solution of 28.1 grams (100 mMoles) of 3-p-chlorophenylsulphonyl-2-methylpropionylchloride in 30 mls. of chloroform was added with stirring over a period of 45 minutes to a mixture of 4.4 grams (110 mMoles) of sodiumhydroxide, 3.8 grams (55 mMoles) of a 50 percent aqueous hydrogen-peroxide solution and two drops of cetaline at 0° C. After maintaining the reaction mixture at 0°–5° C. for a further 60 minutes, 150 mls. of petroleum ether were added slowly. The precipitate that formed was filtered off and washed with water until neutral reaction to yield 22.4 grams of di(3-p-chlorophenylsulphonyl-2-methylpropionyl) peroxide with an active oxygen content of 2.99 percent (theor.: 3.06 percent). The peroxide obtained was not shock-sensitive. When heated in the dry state, the compound melted at 80° C. with evolution of gas. The infra-red spectrum showed absorption of the carbonyl group at 1,780 and 1,820 cm$^{-1}$ and of the sulphonyl group at 1,120 and 1,295 cm$^{-1}$. The product of this example has the structural formula:

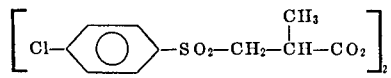

EXAMPLE 15

A solution of 29.5 grams (100 mMoles) of 3-(p-chlorobenzylsulphonyl)-2-methylpropionylchloride in 50 mls. of chloroform was added with stirring over a period of 30 minutes to a mixture of 4.4 grams (110 mMoles) of sodium-hydroxide, 3.8 grams (55 mMoles) of a 50 percent aqueous hydrogenperoxide solution and two drops of cetaline at 0° C. After maintaining the reaction mixture at 0° – 5° C. for a further 60 minutes, 150 mls. of petroleum ether were slowly added. The precipitate that formed was filtered off, washed with water and methanol to yield 23.1 grams of di[3-(p-chlorobenzylsulphonyl)-2-methylpropionyl] peroxide with an active oxygen content of 2.60 percent (theor.: 2.90 percent). The peroxide obtained was not shock-sensitive. When heated in the dry state the compound melted at 75° C. with evolution of gas. The infra-red spectrum showed absorption of the carbonyl group at 1,775 and 1,805 cm$^{-1}$ and of the sulphonyl group at 1,120 and 1,295 cm$^{-1}$. The product of this example has the structural formula:

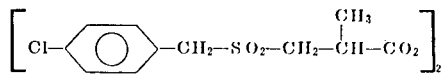

EXAMPLE 16

1.59 grams (15.9 mMoles) of triethylamine were added over a period of 10 minutes to a solution of 4.64 grams (15 mMoles) of 3-(4-t-butylcyclohexylsulphonyl)-2-methylpropionylchloride and 0.54 grams (7.9 mMoles) of a 50 percent aqueous hydrogen peroxide solution in 70 mls. of dimethoxyethane at −40° C. After 30 minutes at 40° C., the reaction mixture was poured out into ice-water. The white precipitate that formed was filtered off from the aqueous suspension, dried and recrystallized by dissolving it in chloroform followed by precipitating with petroleum ether to yield 2.3 grams of white di[3-(4-t-butylcyclohexylsulphonyl)-2-methyl-propionyl] peroxide with an active oxygen content of 2.49 percent (theor.: 2.77 percent). The compound was not shock-sensitive. When heated in the dry state, it melted at 85° C. with evolution of gas. The infra-red spectrum showed absorption of the carbonyl group at 1,770 and 1,800 cm$^{-1}$ and of the sulphonyl group at 1,120 and 1,295 cm$^{-1}$. The product of this example has the structural formula:

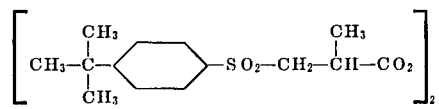

EXAMPLE 17

A solution of 20.9 grams (90 mMoles) of 3-phenylsulphonylpropionylchloride in 60 mls. of chloroform was added with stirring over a period of 15 minutes to a mixture of 3.96 grams (99 mMoles) of sodiumhydroxide, 3.37 grams (49.5 mMoles) of a 50 percent aqueous hydrogenperoxide solution and two drops of cetaline at 0° C. After maintaining the reaction mixture at 0° – 5° C. for a further 90 minutes, 50 mls. of methanol were added. The white precipitate that formed was filtered off and washed with water and methanol to yield 15.1 grams of di(3-phenylsulphonylpropionyl) peroxide with an active oxygen content of 3.72 percent (theor.: 3.76 percent). The product of this example has the structural formula:

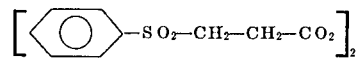

EXAMPLE 18

A solution of 24.65 grams (100 mMoles) of 3-benzylsulphonylpropionyl chloride in 150 mls. of methylene chloride was added with stirring over a period of 30 minutes to a mixture of 4.4 grams (110 mMoles) of sodiumhydroxide, 3.8 grams (55 mMoles) of a 50 percent aqueous hydrogenperoxide solution and two drops of cetaline at 0° C. After maintaining the reaction mixture at 5° – 10° C. for a further 90 minutes, 200 mls. of methanol were added. The precipitate that formed was filtered off, washed with methanol and water to yield 11.4 grams of di(3-benzylsulphonylpropionyl) peroxide with an active oxygen content of 3.40 percent (theor.: 3.53 percent). The product of this example has the structural formula:

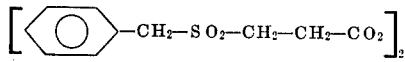

EXAMPLE 19

A solution of 29.9 grams (90 mMoles) of 3-laurylsulphonyl propionyl chloride in 100 mls. of chloroform was added with stirring over a period of 45 minutes to a mixture of 3.96 grams (99 mMoles) OF sodiumhydroxide, 3.37 grams (49.5 mMoles) of a 50 percent aqueous hydrogen peroxide solution and two drops of cetaline at 0° C. After maintaining the reaction mixture at 0° – 5° C. for a further 2 hours, the precipitate that formed was filtered off and washed with methanol and water to yield 15.1 grams of di(2-laurylsulphonylpropionyl) peroxide with an active oxygen content of 2.53 percent (theor.: 2.62 percent). The product of this example has the structural formula:

$$[C_{12}H_{25} - SO_2 - CH_2 - CH_2 - CO_2]_2$$

EXAMPLE 20

1.63 grams (16.2 mMoles) of triethylamine were added over a period of 10 minutes to a solution of 4.3 grams (14.7 mMoles) of 4-cyclohexylsulphonylcyclohexane-carbonyl chloride and 0.55 grams (8.1 mMoles) of a 50 percent aqueous hydrogenperoxide solution in 70 mls. of dimethoxyethane at −40° C. After 30 minutes at −40° C., the reaction mixture was poured out into 500 mls. of ice-water. The precipitate that formed was extracted from the aqueous phase with chloroform. By adding petroleum ether to the chloroform solution, the peroxide was precipitated to yield 3.1 grams of di-(4-cyclohexylsulphonylcyclohexanecarbonyl) perioxide with an active oxygen content of 2.20 percent (theor.: 2.93 percent). The peroxide obtained was not shock-sensitive. When heated in the dry state the compound melted at 80° C. with evolution of gas. The infra-red spectrum showed absorption of the carbonyl group at 1,770 and 1,800 cm$^{-1}$ and of the sulphonyl group at 1,115 and 1,295 cm$^{-1}$.

In a similar way, di-(3-cyclohexylsulphonylcyclo-hexanecarbonyl)peroxide was prepared starting from 3-cyclohexylsulphonylcyclohexanecarbonylchloride. The product of this example has the structural formula:

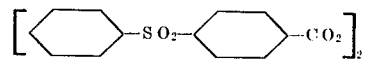

What is claimed is:

1. An organic diacyl peroxide having the general formula

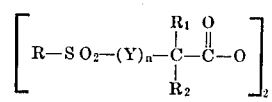

in which:

$n$ has the numerical value of 0 or 1;

Y is selected from the class consisting of lower alkylene groups and groups which, together with $R_1$, form cyclohexylene;

R is selected from the class consisting of straight and branched alkyl groups having up to 18 C-atoms, cyclohexyl, phenyl, benzyl, phenyl substituted by lower alkyl and halogen, benzyl substituted by halogen, and groups which, together with $R_1$, form lower alkylene groups;

$R_1$ is selected from the class consisting of hydrogen, lower alkyl groups and lower alkylsulphonyl alkylene groups; and $R_2$ is selected from the class consisting of hydrogen and lower alkyl groups.

2. An organic diacyl peroxide according to claim 1; in which Y is methylene.

3. An organic diacyl peroxide according to claim 2; in which each of $R_1$ and $R_2$ is selected from the group consisting of hydrogen and methyl.

4. An organic diacyl peroxide according to claim 3; in which R is selected from the group consisting of $C_4H_9$ and $C_{12}H_{25}$.

5. An organic diacyl peroxide according to claim 1; in which each of $R_1$ and $R_2$ is selected from the group consisting of hydrogen and methyl.

6. An organic diacyl peroxide according to claim 1; in which R is selected from the group consisting of $C_4H_9$ and $C_{12}H_{25}$.

* * * * *